(12) United States Patent
Crickmore et al.

(10) Patent No.: US 10,247,584 B2
(45) Date of Patent: Apr. 2, 2019

(54) FIBRE OPTIC DISTRIBUTED SENSING

(71) Applicant: OPTASENSE HOLDINGS LIMITED, Farnborough, Hampshire (GB)

(72) Inventors: Roger Crickmore, Farnborough (GB); Emery Ku, Farnborough (GB)

(73) Assignee: Optasense Holdings Limited (GB)

( * ) Notice: Subject to any disclaimer, the term of this patent is extended or adjusted under 35 U.S.C. 154(b) by 329 days.

(21) Appl. No.: 15/309,076

(22) PCT Filed: May 8, 2015

(86) PCT No.: PCT/GB2015/051361
§ 371 (c)(1),
(2) Date: Nov. 4, 2016

(87) PCT Pub. No.: WO2015/170117
PCT Pub. Date: Nov. 12, 2015

(65) Prior Publication Data
US 2017/0074688 A1    Mar. 16, 2017

(30) Foreign Application Priority Data
May 8, 2014   (GB) .................................. 1408130.1

(51) Int. Cl.
*G01D 5/353*   (2006.01)
*G01K 11/32*   (2006.01)
(Continued)

(52) U.S. Cl.
CPC ......... *G01D 5/35361* (2013.01); *G01D 18/00* (2013.01); *G01K 11/32* (2013.01); *G01K 11/3206* (2013.01); *G01L 1/246* (2013.01)

(58) Field of Classification Search
CPC .... G01D 5/35361; G01D 18/00; G01K 11/32; G01K 11/3206; G01L 1/246
See application file for complete search history.

(56) References Cited

U.S. PATENT DOCUMENTS 7,034,272 B1 *  4/2006  Leonard ................. G01B 11/25
                                                             250/208.1
9,287,972 B2     3/2016  Kishida

FOREIGN PATENT DOCUMENTS

WO    WO 98/27406      6/1998
WO    WO2012/030814    8/2012

* cited by examiner

*Primary Examiner* — Georgia Y Epps
*Assistant Examiner* — Don Williams
(74) *Attorney, Agent, or Firm* — McDonnell Boehnen Hulbert & Berghoff LLP

(57) ABSTRACT

This application describes methods and apparatus for distributed fiber optic sensing that reduce or compensate for the effects of laser phase noise. The method involves repeatedly interrogating an optical fiber (101), where each interrogation involves launching at least one interrogating pulse into the optical fiber; detecting optical radiation which is backscattered from within the fiber, and forming a measurement signal from a plurality of sensing portions of the fiber. The method involves forming a laser noise template based on the measurement signals within a frequency band of interest from a first set of said sensing portions; and applying a correction to the measurement signals from said plurality of sensing portions based on said laser noise template. The first set of sensing portions may be temperature and/or strain stable portion from an isolated section of fiber (301, 303) or may comprise a selected set of sensing portions, which may include substantially all the sensing portions, which are averaged to form the laser phase noise template. For a phase based DAS type sensor the laser phase noise template may simply be subtracted from the measurement signals. For an intensity based sensor it may be necessary to polarity align and normalize the signals of the first set before averaging and then determine a gain-time profile for each sensing portion prior to applying the correction.

20 Claims, 4 Drawing Sheets

(51) Int. Cl.
*G01D 18/00* (2006.01)
*G01L 1/24* (2006.01)

FIBRE OPTIC DISTRIBUTED SENSING

FIELD OF THE INVENTION

This application relates to fibre optic distributed sensing, and especially to methods and apparatus for detecting and/or correcting for laser phase noise.

BACKGROUND OF THE INVENTION

Fibre optic sensing is a known technique where an optical fibre, deployed as a sensing fibre, is interrogated with interrogating radiation and radiation which emerges from the fibre is detected and analysed to determine environmental changes acting on the optical fibre. Some fibre optic sensors rely on deliberately introduced features within the fibre, e.g. fibre Bragg gratings or the like, to induce reflection from a point in the fibre. In a fibre optic distributed sensor however the radiation which is backscattered from inherent scattering sites within the fibre is detected. The sensing function is thus distributed throughout the fibre and the spatial resolution and arrangement of the various sensing portions depends on the characteristics of the interrogating radiation and the processing applied.

Fibre optic sensors for distributed temperature sensing (DTS) are known which rely on detecting light which has been subjected to Brillouin and/or Raman scattering. By looking at the characteristics of the Brillouin frequency shift and/or the amplitudes of the Stokes/anti Stokes components the absolute temperature of a given sensing portion of fibre can be determined. DTS is a useful technique with a range of applications but most DTS systems require relatively long time averages to provide the desired accuracy, meaning such DTS systems are less useful for detecting relatively rapid changes in temperature.

Fibre optic sensors for distributed acoustic sensing (DAS) are also known. Various types of DAS sensor have been demonstrated including sensors based on Rayleigh scattering of light from the sensing fibre. Light transmitted into an optical fibre will be scattered from the various inherent scattering sites within an optical fibre. A mechanical vibration of the fibre, such as caused by an incident acoustic wave, will alter the distribution of scattering sites resulting in a detectable change in the properties of the Raleigh backscattered light. Analysing such changes allows relatively high frequency vibrations/acoustic stimuli acting on sensing portions of the optical fibre to be detected.

DAS sensors therefore perform repeated interrogations of the sensing fibre. Each interrogation involves transmitting at least one pulse of coherent optical radiation into the optical fibre and detecting the intensity of backscattered light from each of a number of sensing portions of the sensing fibre, also called channels, of the DAS sensor. In one type of DAS sensor the intensity of backscatter from a given channel in response to separate interrogations of the sensing fibre is monitored to determine any acoustic stimulus acting on the fibre. Typically each interrogation involves launching a single continuous pulse of interrogating radiation. In the absence of any environmental stimulus the backscatter intensity from any given sensing portion should remain the same for each repeated interrogation (provided the characteristics of the interrogating pulse remains the same). However an environmental stimulus acting on the relevant sensing portion of the fibre will result in an optical path length change for that section of fibre, e.g. through stretching of the relevant section of fibre and/or a refractive index modulation. As the backscatter from the various scattering sites within the sensing portion of fibre will interfere to produce the resulting intensity, a change in optical path length will vary the degree of interference and thus result in a change in backscatter intensity. This change in intensity can be detected and used as an indication of a disturbance acting on the fibre, such as an incident acoustic wave.

Such DAS sensors, in which the measurement signal is based on intensity variations in the detected Rayleigh backscatter, have been advantageously employed in a wide range of applications. One issue with such sensors however is that the relative intensity change in response to a given input stimulus will vary from channel to channel and can also vary for a given channel over time. In other words the gain of the channels is variable. This means that it can be difficult to determine quantitative information about the stimulus from such a sensor. Also such sensors typically do not provide any reliable detection of low frequency disturbances on the optical fibre, i.e. the level of low frequency signal that can detected without signal distortion is low.

In another type of DAS sensor each interrogation involves launching two pulses of differing optical frequencies into the fibre. This means that the backscatter received at the detector comprises backscatter from both pulses, which will interfere, and thus there will be a signal component at the frequency difference between the pulses. If the two pulses are spatially separated in the fibre then any environmental disturbance acting on the fibre, between portions of the fibre where the pulses are reflected from, will lead to an optical path length change. This in turn will produce a phase change in the signal at this difference frequency, which can be thought of as a signal at a carrier frequency. By an appropriate choice of carrier frequency and processing of the detected signal this phase change can be related to the amplitude of the disturbance acting on the fibre. Again the characteristics of the interrogating radiation, i.e. the frequencies and durations of the two pulses, would typically be the same for each interrogation.

Such a phase based DAS system can provide an indication of the actual amount of phase shift caused by an incident stimulus and thus provide a quantitative measure of amplitude of any disturbance.

Typically DAS sensors have been used to detect relatively fast changing dynamic stimuli acting on the sensing fibre, i.e. to detect stimuli with frequencies of the order of tens of Hz or higher. The signals detected by each channel of the DAS sensor may therefore typically be high pass filtered as part of the processing to remove any low frequency effects and DC offset.

Recently however it has been proposed to detect and monitor low frequency stimuli acting on the sensing fibre using Rayleigh based DAS sensing. Low frequency effects, such as low frequency strains and/or temperature changes can result in optical path length changes in the sensing portions of the optical fibre for instance through physical length changes of the fibre and/or refractive index modulation. Such effects have typically previously been discounted as low frequency noise and, as mentioned, reduced/removed by filtering. However it has been appreciated that the low frequency effects in the Rayleigh backscatter may provide useful information about temperature and strain changes.

One issue however with Rayleigh based DAS sensors is frequency drift in the optical source which is used to generate the coherent interrogating radiation, e.g. laser phase noise. DAS sensors typically use a laser as an optical source in a DAS interrogator unit. The output of the optical source is typically input to one or more amplitude and/or frequency modulators to generate the waveform of the desired interrogating pulses, e.g. a single pulse or two temporally separated pulses at different optical frequencies. The optical source may, in use, exhibit drift in the frequency of the output of the light emitted over time. A change in the base frequency of the output of the optical source will result in a corresponding change in the frequency of the interrogating radiation, with a consequent change in properties of the backscatter interference signal. This change will affect the backscatter interference signal in a similar fashion to a low frequency change in optical path length and represents a noise component in the measurement signal at low frequencies.

SUMMARY OF THE INVENTION

Embodiments of the present invention aim to provide methods and apparatus for distributed fibre optic sensing which at least mitigate at least some of the above mentioned disadvantages.

Thus according to the present invention there is provided a method of distributed fibre optic sensing comprising:
repeatedly interrogating an optical fibre with at least one interrogating pulse of optical radiation and detecting optical radiation which is Rayleigh backscattered from within said fibre to form a measurement signal for each of a plurality of sensing portions of said sensing fibre;
forming a laser noise template based on the measurement signals within a frequency band of interest from a first set of said sensing portions; and
applying a correction to the measurement signals from said plurality of sensing portions based on said laser noise template.

The first set of sensing portions may comprise at least one sensing portion in a part of the optical fibre which is arranged to be substantially isolated from temperature and/or strain changes. The first set of sensing portions may comprise substantially all of said plurality of sensing portions. In some embodiments the first set of sensing portions is selected by analysing the measurement signals to identify measurement signals that exhibit the largest variation within said frequency band of interest.

The first set of sensing portions may comprise more than one sensing portion and forming the laser noise template may comprise averaging the measurement signals within the frequency band of interest from the first set.

In some embodiments interrogating the fibre may comprise launching two spatially separated pulses at different frequencies and the measurement signal may represent a determined change in phase. Applying the correction to the measurement signals may then comprise subtracting the laser noise template from the measurement signals.

In some embodiments interrogating the fibre may comprise launching one pulse and the measurement signal may represent a determined change in intensity in backscatter. Where the first set of sensing portions comprises more than one sensing portion the step of forming the laser noise template may then comprise normalising a measure of the amplitude of the measurement signals for each of the sensing portions of the first set within said frequency band of interest prior to averaging said measurement signals. Additionally or alternatively forming the laser noise template may comprise aligning the polarity of the change in intensity for the measurement signals for each of the sensing portions of the first set within said frequency band of interest prior to averaging said measurement signals.

In such embodiments applying a correction to the measurement signals from the plurality of sensing portions may comprise, for each sensing portion, determining a gain-time profile for that sensing portion, scaling the laser noise template by the gain-time profile, and subtracting the scaled laser noise template from the measurement signal for that sensing portion. Determining the gain-time profile for a sensing portion may comprise scaling the laser noise template to match the peak-to-peak intensity variation in the measurement signal within the frequency band of interest within a first time window and, within a plurality of time sub-windows within the first time window identifying a gain value that minimises the error between the measurement signal and the laser noise profile in that time sub-window.

In some embodiments the method comprises applying a frequency variation to the optical radiation of at least one interrogation compared to another interrogation. The method may then comprise identifying a change in the measurement signals from said sensing portions resulting from said frequency variation and using said identified change to determine at least one characteristic of an operating point of the sensor portion. The characteristic of an operating point may comprise at least one of a gain value and a polarity of intensity change for said sensing portion. The laser noise template may be based on the measurement signals for said first set of sensing portion adjusted by said determined characteristic of an operating point.

In some embodiments any such frequency variation may comprise a cycle of frequency modulation which repeats at a modulation cycle rate.

Embodiments of the present invention therefore relate to methods of identifying and/or correcting for any components in the measurement signals due to laser frequency drift, i.e. laser phase noise, in a DAS sensor.

Aspects of the present invention also relate to processing data from a DAS sensor. In another aspect therefore there is provided a method of processing data from a distributed fibre optic sensor, the method comprising:
taking data corresponding to a measurement signal for each of a plurality of sensing portions of said distributed fibre optic sensor, the measurement signal being indicative of changes in detected optical radiation which is Rayleigh backscattered from within an optical fibre in response to repeated interrogations of said optical fibre with at least one interrogating pulse of optical radiation;
forming a laser noise template based on the measurement signals within a frequency band of interest from a first set of said sensing portions; and
applying a correction to the measurement signals from said plurality of sensing portions based on said laser noise template.

Any of the variations of the first aspect described above may be implemented in the method of processing.

In a further aspect of the invention there is provided computer software on a non-transitory storage medium which, when run on a suitable computing device, perform the method as described above.

Aspects of the invention also relate to sensing apparatus. Thus in a further aspect of the invention there is provided a distributed fibre optic sensor apparatus comprising:
an optical source configured to repeatedly interrogating an optical fibre with at least one interrogating pulse of optical radiation;
a detector for detecting optical radiation Rayleigh backscattered from within said optical fibre;
a processor configured to:
form a measurement signal for each of a plurality of sensing portions of said sensing fibre;

form a laser noise template based on the measurement signals within a frequency band of interest from a first set of said sensing portions; and applying a correction to the measurement signals from said plurality of sensing portions based on said laser noise template.

The apparatus of this aspect of the invention may be configured to perform any of the method variants discussed above.

DESCRIPTION OF THE DRAWINGS

The invention will now be described by way of example only with respect to the accompanying drawings, of which.

DESCRIPTION OF THE INVENTION

Figure 1:
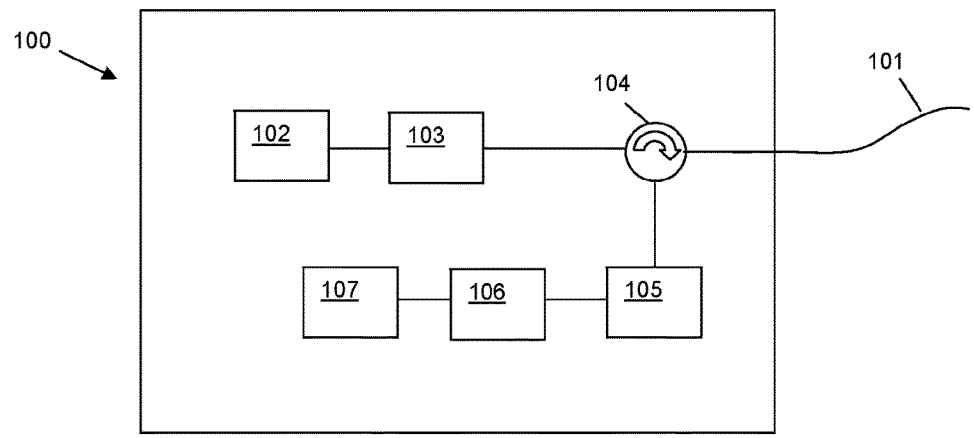
FIG. 1 illustrates a conventional fibre optic distributed sensor.

FIG. 1 shows a schematic of a general distributed fibre optic sensing arrangement. A length of sensing fibre 101 is removably connected at one end to an interrogator 100. The sensing fibre is coupled to an output/input of the interrogator using conventional fibre optic coupling means. The interrogator unit is arranged to launch pulses of coherent optical radiation into the sensing fibre 101 and to detect any radiation from said pulses which is backscattered within the optical fibre. For a Rayleigh scattering based distributed acoustic sensing (DAS) apparatus the detector will detect radiation which has been Rayleigh backscattered from within the fibre and which is thus at the same frequency as the interrogating radiation. To generate the optical pulses the interrogator unit 100 comprises at least one laser 102. The output of the laser may be received by an optical modulator apparatus 103. Note that as used herein the term "optical" is not restricted to the visible spectrum and optical radiation includes infrared radiation, ultraviolet radiation and other regions of the electromagnetic spectrum.

The optical modulator apparatus 103 may be configured to generate the required optical waveform for the interrogating radiation. For a DAS system where each interrogation comprises two temporally/spatially separated pulses with a frequency difference between the pulses the modulator apparatus may, for example, comprise at least one delay loop and a frequency modulator for imparting a frequency modulation to the radiation generated by the laser 102. The pulse(s) output from the optical modulator 103 for each interrogation are then transmitted into the sensing fibre 101, for instance via a circulator 104.

The sensing fibre 101 can be many kilometers in length and can be, for instance 40 km or more in length. The sensing fibre may be a standard, unmodified single mode optic fibre such as is routinely used in telecommunications applications without the need for deliberately introduced reflection sites such a fibre Bragg grating or the like. Multimode fibre can also be used but the measurements are typically of a lower quality than if a single mode fibre was used. The ability to use an unmodified length of standard optical fibre to provide sensing means that low cost readily available fibre may be used. The optical fibre will typically be protected by containing it with a cable structure. In some embodiments the fibre may comprise a fibre which has been fabricated to be especially sensitive to incident vibrations or the cable structure may have been designed to achieve the same effect. In use the fibre 101 is deployed in an area of interest to be monitored.

Optical radiation which is backscattered from said optical pulses propagating within the sensing fibre is directed to at least one photodetector 105, again for instance via circulator 104. The detector output is sampled by an analogue to digital converter (ADC) 106 and the samples from the ADC are typically passed to processing circuitry 107 for processing (although in theory the base data samples could be output). The processing circuitry 107 may process the detector samples to determine an overall backscatter intensity from each of a number of different channels, each channel corresponding to a different longitudinal sensing portion of optical fibre. In some arrangements the processing circuitry 107 may provide most of the processing to indicate any acoustic signals acting on the channels of the sensor. However in some embodiments the output from interrogator 100 may be passed to an external signal processor (not shown), which may be co-located with the interrogator or may be remote therefrom, and optionally a user interface/graphical display, which in practice may be realised by an appropriately specified PC. The user interface may be co-located with the signal processor or may be remote therefrom.

It will be noted that the interrogator unit may comprise various other components such as amplifiers, attenuators, filters etc. but such components have been omitted in FIG. 1 for clarity in explaining the general function of the interrogator.

The laser 102 (and modulator 103 if present) are configured to repetitively launch one or more interrogating pulses into the fibre at a given launch rate, often called a ping rate, and the detector detects the radiation backscattered from said pulse(s) following each launch. When an interrogating pulse propagates within the optical fibre some light will be scattered from the intrinsic scattering sites within the optical fibre. At least some of this backscattered light will be guided back to the beginning of the optical fibre where it can be detected. At any instant the light arriving at the detector may comprise light scattered from a range of scattering sites distributed through a section of fibre.

The launch repetition rate, also referred to as the ping rate, is set so that the time between interrogations is at least as long as the round trip time for light to reach the end of the fibre and return (or, for a very long fibre, a distance into the fibre from which no significant backscatter is expected). This ensures that any backscattered light received at the start of the fibre can be uniquely identified with a section of fibre and the backscatter signals from two interrogations do not interfere with each other at the detector. For a fibre which is 40 km this would require enough time to allow a round trip in the fibre of 80 km. If the refractive index of the fibre is n=1.5 say so that the speed of light in the fibre is roughly $2 \times 10^8$ ms$^{-1}$ then the time between interrogations should be at least 0.4 ms and the ping rate should be less than 2.5 kHz. Obviously higher ping rates could be used for shorter fibres. Clearly the ping rate determines the effective sample rate of the sensor and thus the ping rate should ideally be set high enough so that the Nyquist limit is above the maximum frequency of the acoustic signals of interest.

Note that as used in this specification the term interrogation shall be taken to mean an instance of launching interrogating radiation into the fibre and detecting the backscatter signal from the fibre. As mentioned an interrogation may, for instance comprise a single continuous pulse or may comprise two or more distinct pulses that are relatively closely spaced. The structure of the interrogation is such that light backscattered from the pulse(s) of an interrogation produces an interference signal which provides the measurement signal, whereas light from successive interrogations does not interfere.

For completeness it should be noted that wavelength division multiplexing techniques can be used so that different series of interrogations can be present in the fibre at the same time and thus there may be backscatter received simultaneously from one interrogation of a first series and also backscatter from a separate interrogation from a second, different series at a different wavelength. In such a situation however the measurement signal from the first interrogation series is processed separately from the second interrogation series.

Figure 2:
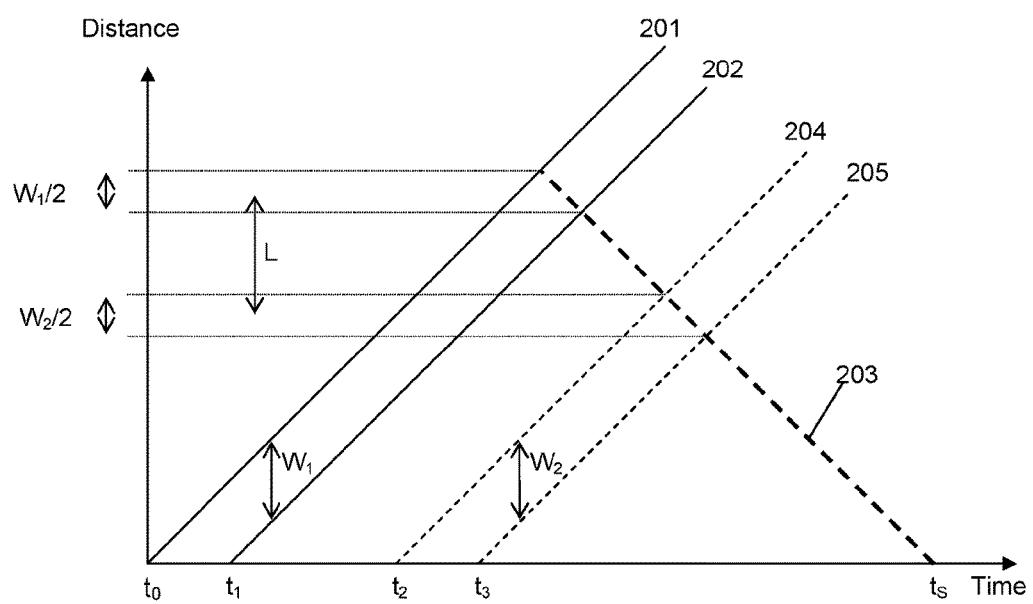
FIG. 2 illustrates the propagation of an optical pulse in the sensing fibre.

FIG. 2 illustrates the propagation of pulses in the optical fibre and shows distance along the fibre against time. Lines 201 and 202 illustrate the leading and trailing edges of a first pulse respectively. Thus at time $t_0$ the leading edge of the pulse enters the optical fibre and at $t_1$ the trailing edge of the pulse enters the fibre. The time between $t_0$ and $t_1$ therefore corresponds to the duration of the pulse. The pulse propagates in the fibre at a velocity equal to c/n where c is the speed of light in vacuo and n is the effective refractive index of the optical fibre. In the fibre the pulse will thus have a spatial width, $W_1$, represented by the vertical distance between lines 201 and 202.

As the pulse propagates in the optical fibre some light will be backscattered towards the start of the fibre. This backscattered light will also travel at a velocity equal to c/n. Consider the light reaching the detector. Line 203 represents the trajectory of light which could possibly be received at the start of the optical fibre at a given sampling instant $t_S$. Any backscattering which occurs at a time and distance into the fibre that lies on line 203 could be received at the start of the fibre at the same instant $t_S$. Thus it can be seen that light which is scattered at various times from a first section of the fibre as the pulse propagates through that section will be coincident at the start of the fibre (and hence coincident on the detector). It can also be seen that the width of this first section of fibre is equal to half the width of the pulse in the fibre, i.e. $W_1/2$.

This means that at any instance the backscattered light received at the start of the optical fibre from this first pulse corresponds to backscattering in the fibre from a number of scattering sites distributed through a certain section of fibre. The length of this section of fibre is defined by the pulse width of the interrogating radiation. The minimum spatial size of the discrete sensing portions, which may be referred to as the gauge length, is thus defined by the width of the interrogating pulse.

For DAS sensors which use a single interrogating pulse each launch the spatial width of the pulse in the optical fibre is thus typically chosen with regard to the desired spatial resolution of the sensing portions of the fibre. Thus for a spatial resolution of the order of about 10 m say the duration of the pulse may be chosen to correspond to a spatial width in the fibre of the order of about 20 m.

The backscatter signal received at the detector is therefore an interference signal resulting from the combination of the scattered light from all of the scatter sites within a section of fibre that arrive at the detector at that instant. The distribution of scattering sites within a given section of fibre is effectively random and thus the number of scattering sites and distribution of such sites within a section of fibre will vary along the length of the fibre. Thus the backscatter intensity received from different sections of fibre will vary in a random way. However, in the absence of any environmental changes affecting the fibre the distribution of scattering sites in a given section of fibre will remain the same and thus the backscatter intensity from a given section of fibre will be consistent for identical interrogating pulses. Any mechanical disturbances of the fibre, such as bending caused by an incident acoustic wave, will change the distribution of scattering sites and the effective refractive index of that part of the fibre and thus lead to a change in the resulting backscatter intensity.

In a simple model the number of scattering sites can be thought to determine the amount of scattering that could occur and the distribution of such scattering sites determines the interference. An acoustic stimulus leading to a strain on the fibre may result in a change of optical path length within the relevant section of fibre (which could be a physical change in length and/or a change in the effective refractive index in part of the fibre). In this simple model this can be thought of as changing the separation of the scattering sites but without any significant effect on the number. The result is a change in interference characteristics. In effect the acoustic stimulus leading to optical path length changes in the relevant section of fibre can be seen as varying the bias point of a virtual interferometer defined by the various scattering sites within that section of fibre.

Some DAS sensors use interrogations which comprise two spatially separated pulses, typically with a frequency difference between the pulses in each interrogation. Referring back to FIG. 2 there may therefore be a second pulse which follows the first pulse. Lines 204 and 205 illustrate the leading and trailing edges of the second pulse respectively. Thus at time $t_3$ the leading edge of the second pulse enters the fibre and at time $t_4$ the trailing edge of the second pulse enters the fibre. This second pulse will therefore have a spatial width $W_2$ in the fibre. As described previously the line 203 represents the path for light reaching the start of the fibre, and hence the detector, at a given instant $t_S$. It can therefore be seen that with such a two-pulse interrogation light from a first section of fibre (having a width $W_1/2$) will be received at the start of the fibre at the same time as light from a second section of fibre (having a width $W_2/2$), with the first and second sections being separated by a distance L (illustrated as measured from the centre of each section). If the first pulse has an optical frequency f1 and the second pulse has a different optical frequency f2 then the light from the first section will be an interference signal at frequency f1 and the light from the second section will be an interference signal at a frequency f2. The result will be an interference signal with a component at $\Delta f$, where $\Delta f = f1 - f2$.

The backscatter signal received at the detector at any instant can therefore be seen as comprising an interference signal at a carrier frequency $\Delta f$ equal to the frequency difference between the two pulses of the interrogating radiation. Again as the distribution of scattering sites varies along the length of the fibre the backscatter intensity received from different sections of fibre will vary in a random way but, in the absence of any environmental changes affecting the fibre, will be consistent for identical interrogations. In this embodiment however any mechanical disturbances of the fibre, such as bending caused by an incident acoustic wave, which result in an effective path length change in the part of the fibre between the first and second sections, will result in a change in amplitude and phase of the interference signal at the carrier frequency. This phase change in the carrier frequency can be detected and used as an indication of a stimulus acting on the fibre.

In such a two pulse system the minimum size of spatial resolution achievable depends on the separation between the pulses (the gauge length can be seen as half the distance between the pulses, e.g. as measured from the centre of each pulse) and thus to achieve a given spatial resolution the spatial separation of the pulses is set with the required spatial resolution in mind and each individual pulse has a width which is typically much less than the separation between pulses. In this way the channels are mainly sensitive to any optical part of the fibre between the two scattering sections and the change in phase of the carrier signal is linearly related to the optical path length change.

It will therefore be clear that by repeatedly launching interrogating pulses into the fibre and looking at the backscatter intensity the same time after launch, any changes in backscatter intensity from a given section of fibre can be determined and hence any acoustic disturbance of the fibre detected. Note as used herein the term "acoustic" is taken to mean any type of pressure wave of vibrational type stimulus and for the avoidance of doubt will include seismic stimuli. The term acoustic shall also be taken to cover ultrasonic and infrasonic stimuli.

The pulse characteristics used for one interrogation, i.e. the intensity and frequency of the interrogating radiation for each pulse and the pulse duration and/or number of pulses in an interrogation, should be repeated for a subsequent interrogation in order for the intensity of the backscatter returns to be compared. Clearly if a greater amount of light is injected in one interrogation than the next, for instance by altering the overall pulse duration and/or intensity, this would be expected to result in a variation in backscatter intensity. Altering the number of pulses and/or pulse duration between interrogations would also result in the backscatter from different sections of the fibre being compared.

In addition varying the frequency of the interrogating radiation could also lead to a variation in the degree of interference in the backscatter signal. Therefore in order to ensure that any variation in backscatter intensity is due to disturbances acting on the fibre, rather than a variation in the properties of the interrogating radiation, the backscatter from interrogations having the same pulse characteristics should be compared.

One problem however that can arise is that laser 102 used in the interrogator unit 100 may exhibit frequency drift in use. This frequency drift, referred to as laser phase noise, can result in a slow variation in the phase and intensity of the measurement signal from the channels of a DAS sensor even in the absence of any environmental changes acting on the fibre.

For DAS sensors that were used to detect relatively fast moving dynamic stimuli, such as acoustic waves in the frequency range of a few Hz or tens of Hz or higher, high pass filtering is typically applied to the detected signal in order to reduce any low frequency effects such as temperature or low frequency strains on the fibre. Such filtering would also remove/reduce the impact of laser frequency drift, i.e. laser phase noise and thus laser phase noise has not previously been recognised as a particular issue for DAS sensors.

It has been realised however that Rayleigh based sensors based on the principles of DAS may be usefully used in detecting low frequency changes such as changes in temperature or strain. In monitoring such relatively slow acting environmental changes any laser phase noise represents a significant noise source. Therefore advantageously it would be necessary to at least reduce or partially compensate for any laser phase noise to improve the noise floor of the system and allow accurate detection of such environmental changes. In addition even when detecting relatively high frequency acoustic signals it will be noted that laser phase noise can result in a drift of the operating point of the channels of the DAS sensor over time. For an intensity based DAS system these changes can result in a change of the gain of the various sensing channels, i.e. a change in the amount of frequency modulation that an input stimulus of a given amplitude will produce. Such operating changes can make it difficult to compare long term response from a sensing channel of the DAS sensor and thus laser phase noise can be problematic even when detecting relatively high frequency stimuli.

One way to reduce the impact of laser phase noise would be to use frequency-stabilized lasers. However such components may add to the cost and/or complexity of the interrogator unit and such an approach is not feasible for existing interrogator units. Furthermore, stabilisation of the laser phase generally becomes increasingly difficult as the frequency is reduced.

Embodiments of the present invention therefore relate to apparatus and methods for detecting and or reducing/removing the effects of laser phase noise. Embodiments of the invention apply to methods of distributed fibre optic sensing which involve repeatedly interrogating an optical fibre with at least one interrogating pulse of optical radiation and detecting optical radiation which is Rayleigh backscattered from within said fibre to form a measurement signal for each of a plurality of sensing portions of said sensing fibre. Embodiments relate to both intensity based DAS sensors, e.g. using a single continuous pulse per interrogation, and also to phase measuring DAS sensors, e.g. using two pulses defining a carrier frequency.

The method comprises forming a laser noise template based on the measurement signals within a frequency band of interest from a first set of said sensing portions; and applying a correction to the measurement signals from said plurality of sensing portions based on said laser noise template. The laser noise template is a template indicating the effect of any drift in optical frequency of the optical source, e.g. laser over time, in a frequency band of interest. For laser phase noise the frequency of band of interest corresponds to a relatively low frequency, for instance of the order of say 1 Hz or 0.5 Hz down to about 0.01 Hz.

The measurement signals from the first set of sensing portions which are used in forming the laser noise template may therefore be low pass filtered or band-pass filter to remove signals outside the frequency band of interest.

Figure 3:
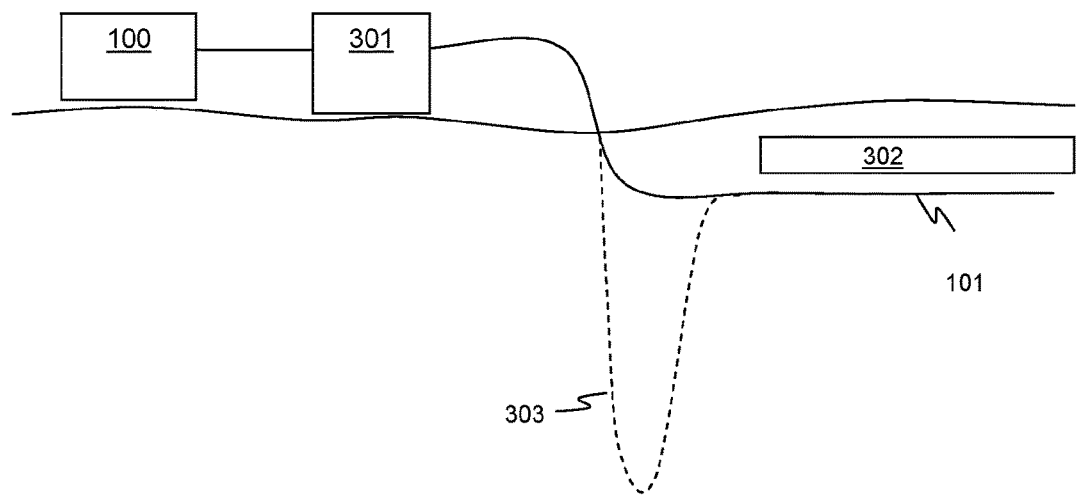
FIG. 3 illustrates one embodiment of the present invention with a sensing fibre having a section isolated from temperature/strain changes.

In some embodiments the first set of sensing portions may correspond to one or more sensing portions which are arranged to be temperature and/or strain stable. As shown in FIG. 3 at least part of the sensing fibre 101 could therefore be located in a relatively controlled or isolated environment. This could comprise a length of fibre in temperature controlled enclosure 301 or could simply comprise a section of the fibre optic cable which is located in a part of the environment which is less likely to be subject to temperature or strain changes. For instance in the embodiment of a sensing fibre buried along the path of a pipeline 302 to provide acoustic and/or thermal monitoring of the pipeline in use part 303 of the fibre 101 could be buried more deeply than the rest of the fibre so as to be less susceptible to temperature variations and or any surface influences.

In this embodiment it will be expected that any low frequency variation in the measurement signals from the sensing portions of the first set may be substantially due to laser phase noise. Thus the measurement signals from the first set of sensing portions in the frequency band of interest may directly provide an indication of the laser phase noise.

In some embodiments however a temperature stable part of the sensing fibre may not be available or it may not be practical to provide a temperature stable part of the sensing fibre. It has been realised however that any frequency drift in the optical radiation used to interrogate the sensing fibre will affect all channels effectively simultaneously. For most DAS based sensing applications with sensing fibre lengths of the order of kilometers it is very unlikely that any temperature effects will be correlated across the whole fibre. This allows a method for laser phase noise to be identified even in the presence of temperature or strain variations.

In some embodiments therefore the first set of sensing portions may comprise substantially all of the sensing portions of the sensor and the method may comprise averaging the measurement signals (in the frequency band of interest) from all of the sensing portions. As mentioned the laser phase noise will affect all sensing channels simultaneously whereas temperature or strain variations are expected to be much more local. Averaging the measurement signals will then produce a signal which is dominated by the laser phase noise and the average may therefore be taken as the laser noise template.

In some embodiments not all of the sensing portions may be used in the first set, for instance the first set may comprise only (or mostly) channels relatively near the front end of the sensing fibre, say in the first kilometer or so, where the backscatter signal is stronger (because of fewer propagations losses—both for the interrogating radiation and the resultant backscatter).

In some instance the sensing portions in the first set may be selected based on the measurement signal exhibiting a relatively strong signal, in the frequency band of interest. It will be appreciated that various sensing portions or channels may occasionally be in a faded state—such faded channels may not exhibit much variation and may be excluded from the formation of the laser noise template. In some instances particular sections of fibre may be exposed to large low frequency signals from other sources such a nearby road or heavy machinery and channels from such sections may also be excluded from the template.

In general then the first set of sensing portions may comprise more than one sensing portion and forming said laser noise template may comprise averaging the measurement signals within said frequency band of interest from said first set.

As mentioned above the method is applicable to phase based fibre optic sensors, i.e. sensors where the measurement value is a measure of phase change (typically of a carrier signal). Interrogating the fibre may therefore comprise launching pulses, for example, two spatially separated pulses at different frequencies, and determining a change in phase in an interference signal, e.g. a carrier signal at the frequency difference between the pulses.

In such a phase based DAS type sensor the effect of any drift in optical frequency will be the same for each channel, i.e. a defined phase variation on each channel. Thus in the case where there is a temperature stable section of fibre the phase variation on the stable channel(s) can be used directly as the laser phase noise template. In this case, where a plurality of measurement signals are used to determine the laser phase noise template, the various measurement signals, which may be filtered, may be averaged to provide the laser noise template. In any case the laser phase noise template will represent an indication of the amount of phase change over time.

In such phase based sensors the measurement signals from the sensing portions of the fibre can thus be corrected by subtracting the laser phase noise template from the actual measurement signal to provide a corrected output. Note as used herein the term subtracted is intended to refer to correcting the measurement signal and may include subtracting a negative phase change, i.e. adding a phase component to the measurement signal.

As also mentioned above the method is also applicable to intensity based fibre optic sensors, i.e. sensors where the measurement value is a measure of change in backscatter intensity. Interrogating the fibre may therefore comprise launching at least one pulse, for example, a single continuous pulse, and determining a change in backscatter intensity of the received backscatter (interference) signal.

In such intensity based DAS type sensors, as will be understood by one skilled in the art, the amount and polarity of intensity variation to a given input stimulus can vary from sensing portion to sensing portion of the sensor.

As mentioned, when illuminated with a single continuous pulse of optical radiation the backscatter from a given sensing portion can be seen as corresponding to a certain bias point of a virtual interferometer defined by the various scattering sites within that section of fibre.

Figure 4:
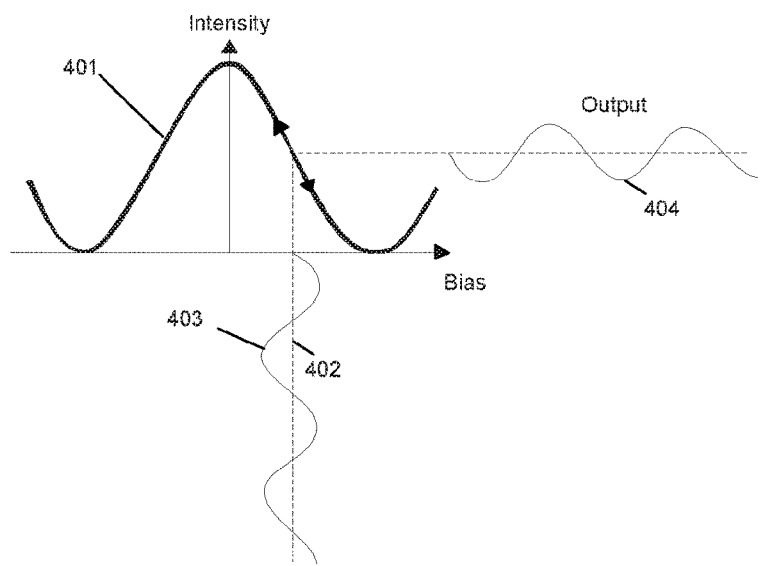
FIG. 4 illustrates the principles of variation in backscatter intensity with bias point.

FIG. 4 illustrates an idealised plot 401 of backscatter intensity against bias point for a given section of fibre. As the bias point is changed, e.g. an optical path length change is imparted to the relevant section of fibre, the backscatter intensity will go through a maximum value to a minimum value (where there is maximum destructive interference).

In the absence of any external stimulus and with a stable interrogating frequency, a given section of fibre can be thought of as having a steady state bias point, i.e. the operating point of a given section of fibre (and equivalently a given channel of the DAS sensor) will lie somewhere on plot 401. FIG. 4 illustrates an operating point 402 for a given section of fibre.

Any acoustic stimulus causing a change in path length will thus result in a variation of the bias point about this operating point. Likewise any variation in frequency of the interrogating radiation will have the same effect. A sinusoidal stimulus (which may be regarded as an optical path length variation or a variation in frequency of the interrogating radiation) is illustrated as input 403. This will cause the intensity of backscatter from that section to vary as indicated thus resulting in the output 404.

It will be clear however that different sections of fibre, i.e. different channels, will have different operating points (as well as different maximum possible output intensities). Each channel can thus be thought of as having a different operating curve, i.e. the response to any input stimulus about its current operating point.

Figure 5:
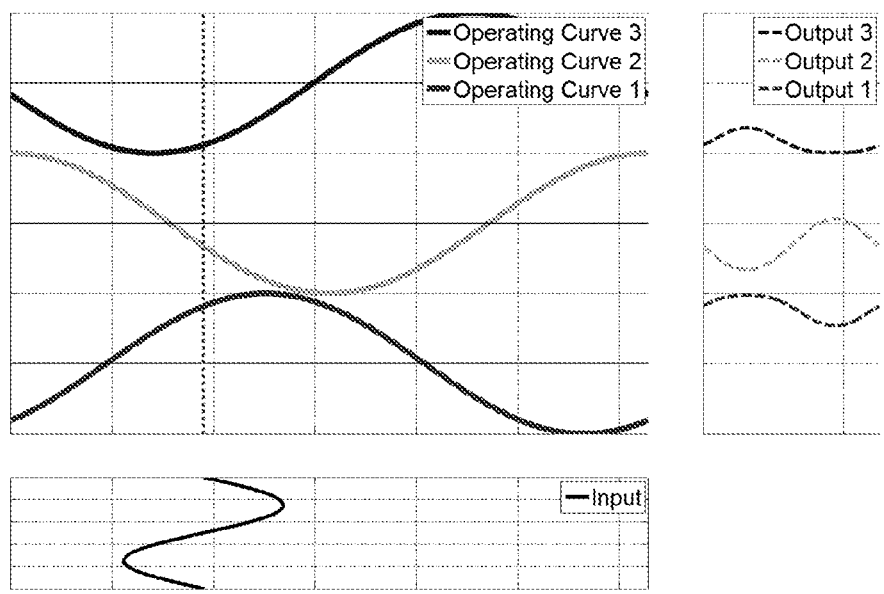
FIG. 5 illustrates the effect of different operating points on the output response to a given input stimulus.

FIG. 5 illustrates the effect of different operating points/operating curves for different channels. FIG. 5 illustrates three different operating curves and the resultant response of each to the same input stimulus.

It can be seen that the output response for operating curves 1 and 3 (bottom and top respectively) are both distorted, in different ways, with respect to the input stimulus. Operating curve 2 exhibits a more linear response and thus the output is not so distorted. It can however be seen that in these curves (where the peak to peak variations of the various operating curves have been normalised over the whole operating curve) that operating curve 2 produces a greater magnitude variation in output intensity for the given input stimulus than operating curves 1 or 3.

It will therefore be clear that a variation in operating point can lead to a non-linear response between an input stimulus and detected intensity variation and that further the gain of a channel depends on its current operating point. It will also be seen that for this operating point the intensity variation exhibited by operating curve 2 has intensity increasing at times when the intensity exhibited by operating curves 1 and 3 is decreasing and vice versa. For the operating point operating curve 2 can therefore be said to lead to a different polarity of response to those of operating curves 1 and 3.

It should be noted that the explanation given above is a relatively simplistic explanation of the various interactions in a sensing fibre to highlight several factors that provide the variation in operating point the various channels of an intensity-based Rayleigh DAS sensor. In reality there may well be other influences and this explanation is not intended to be limiting.

It will be appreciated however that in an intensity based DAS type sensor each sensing portion may have a different operating curve and thus the response of each channel to any laser frequency drift will be different. The method may therefore involve accounting for such different operating points in both generating the laser noise template and also correcting the measurement signal for each sensing portion.

In one embodiment therefore forming the laser noise template comprises normalising the measurement signals for each of the sensing portions of the first set (within said frequency band of interest) prior to averaging said measurement signals. Normalising the measurement signals may comprise scaling the signals so that the peak-to-peak amplitude, or possibly the root mean square (rms) value, are all the same.

Forming the laser noise template may also comprise aligning the polarity of the change in intensity for the measurement signals for each of the sensing portions of the first set within said frequency band of interest prior to averaging said measurement signals. As mentioned above it can be seen that some sensing portions may exhibit a decrease in intensity to a given direction of input stimulus changes whereas other sensing portions exhibit an increase in intensity. Forming an average of such opposite polarity measurement signals would impact adversely on the accuracy of the laser noise template; a template formed based on measurement signals without polarity correction may, in some instance, be close to zero. Thus the polarity of the measurement signals in the frequency band of interest may be aligned.

The polarity of the measurement data for the various sensing portions of the first set may be determined an aligned in various ways.

In one embodiment the measurement data from the sensing portions of the first set may be filtered, for instance low pass filtered with a corner frequency of around 1 Hz. If required the data may be downsampled, for instance to a sample rate of about 20 Hz or so.

In some embodiments, to remove any offset, the mean value of a channel may be subtracted from the value in that channel, although such a step may not be used where the data is band pass filtered.

The processed data from the various channels may then be normalised for ease of comparison and pairs of adjacent channels may be evaluated to assign sign values, for instance by evaluating the dot product of adjacent channels. The sequential sign changes may be saved in a vector. This step may then be repeated with state-change-applied data, but this time using an average as a reference for a given channel, for instance a median-filtered average, to return a new polarization-flip vector. The sign-change vector and polarization-flip vector may be combined and applied to the band-pass filtered measurement data (20 Hz sample rate) to provide the polarity aligned data.

Once the measurement data (in the frequency band of interest) has been normalised and polarity aligned the processed data may be averaged to provide the laser noise template.

For an intensity based DAS type sensor the laser noise profile is thus a reference indicative of the frequency changes of the interrogating radiation, and the intensity changes in a notional reference channel, that occurred over time. However as mentioned above the actual response of each sensing portion will depend on the operating point of that sensing portion. The step of applying a correction to the said measurement signals from the plurality of sensing portions may therefore comprise, for each sensing portion, determining a gain-time profile for that sensing portion. The gain-time profile represents the relevant gain factor for the sensing portion and how it varies over time compared to the laser noise template. Once a suitable gain-time profile has been determined the laser noise template may be scaled by the gain-time profile, and the scaled laser noise template subtracted from the measurement signal for that sensing portion.

In one embodiment determining the gain-time profile for a sensing portion comprises, within a first time window, scaling the laser noise template to match the peak-to-peak intensity variation in the measurement signal. The laser phase noise will typically have an approximately 1/f spectrum and the first time window should be at least as long as required to determine the frequency components of interest. For example in order to determine frequency components down to 0.01 Hz the time window will need to be at least 100 seconds long. In some embodiments the first time window may have a duration of the order of a few minutes or so, say of the order of 5 minutes for example.

Within a plurality of sub-windows (within the first time window) a gain value may be identified that minimises the error between the measurement signal and the laser noise profile in that time sub-window, for instance by calculating the errors for trail gain values in a series of trail steps between a suitable maximum and minimum value.

Once the gain-time profile for the relevant sensing portion has been established the laser noise template can be scaled by the gain-time profile and then the scaled template can be subtracted from the actual measurement signal.

It should be noted that the gain-time profile may additionally be used to render quasi-quantitative information about the amplitude of any thermal stimuli (or low frequency strain).

The embodiments described above thus provide methods and apparatus for removing low frequency artefacts caused by frequency drift in the optical source of an interrogator unit used for DAS type sensing. This allows genuine low frequency effects such as imposed by temperature changes in the environment to be reliably detected, allowing DAS type sensors to be used for detecting temperature changes and/or low frequency strain changes.

Figure 6:
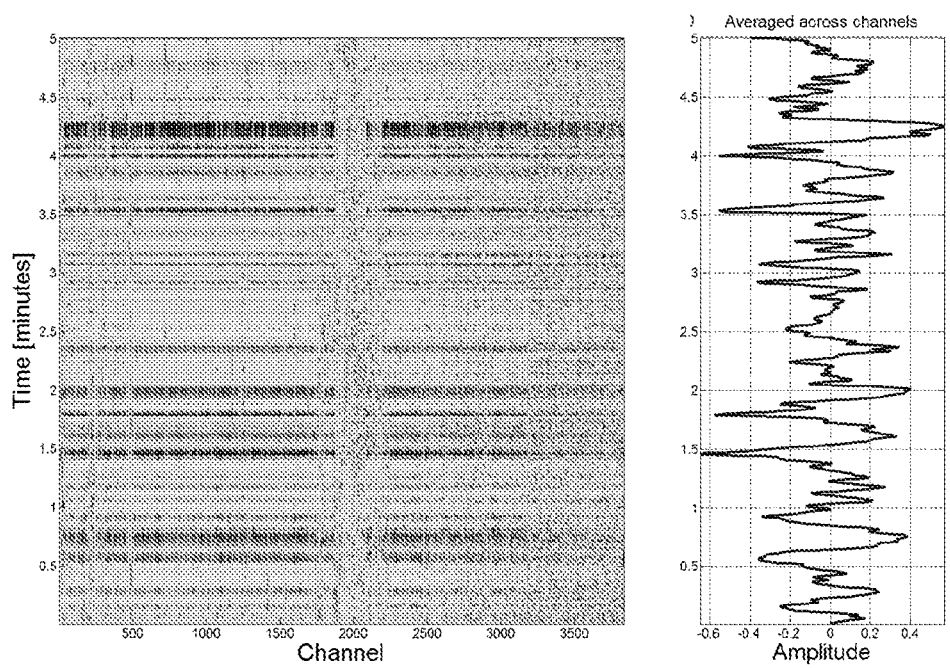
FIG. 6 shows data from a sensing fibre and a determined laser phase noise profile.

The method described above was applied to a data acquired using a single pulse per interrogation intensity based DAS type sensor. FIG. 6 illustrates a waterfall diagram of a five minute window of data from this sensor which used a buried sensing fibre of the order of 40 km long. The waterfall diagram on the left shows time against channel (each channel or sensing portion corresponds to a 10 m section of the sensing fibre) with the amplitude of any variation represented by colour (which is greyscale intensity in the black and white version). This data has been bandpass filtered between 1/60 Hz and 0.5 Hz and so just represents low frequency measurement signals from the various channels. The presence of significant low frequency noise can be seen. Around channel 2000 the low noise signal is less prevalent—this is believed to be due to a strong external stimulus at acoustic frequencies eradicating the low frequency effects.

Based on this data a normalised and polarity aligned average of the amplitude variation was produced as a laser noise template as shown in the right hand side of FIG. 6.

Figure 7:
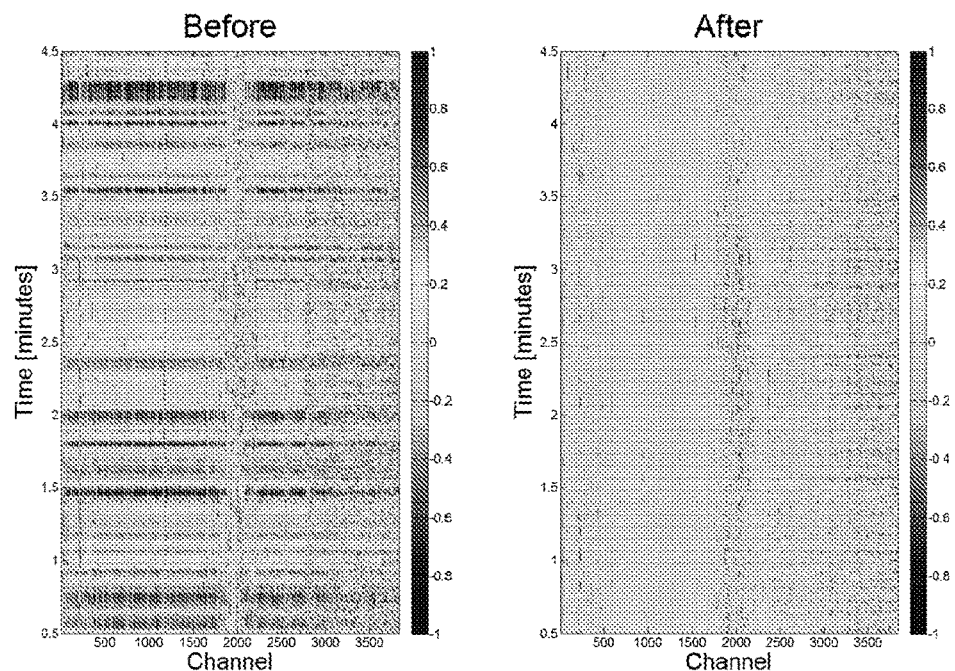
FIG. 7 shows the data from FIG. 6 before and after correction using embodiments of the present invention.

This laser noise template was used to correct the measurement data for the various channels as described above. FIG. 7 illustrates the data before and after correction.

It can be seen that the low frequency data after the correction has been applied is substantially free of any significant artefacts.

The methods described above have described detecting and processing laser phase noise by its effect on all sensing portions of the sensing fibre substantially simultaneously. This technique can be applied during normal operation of a DAS sensor and can enable such a sensor to reliably detect low frequency environmental stimuli acting on the sensing fibre.

In some embodiments however the laser phase noise detection method may comprise applying a deliberate frequency modulation to the interrogating radiation. In this embodiment the operating point of the sensing portions of fibre, i.e. the sensor channels, in a Rayleigh scattering based fibre optic distributed sensor are deliberately modulated. By deliberately modulating the operating point of a sensor channel it is possible to determine information about the current steady state operating point of that channel. Preferably the operating point is modulated in a pre-determined manner. By deliberately modulating the operating point in a known manner any other changes in operating point arising from environmental effects or from laser phase noise can be detected.

Figure 8:
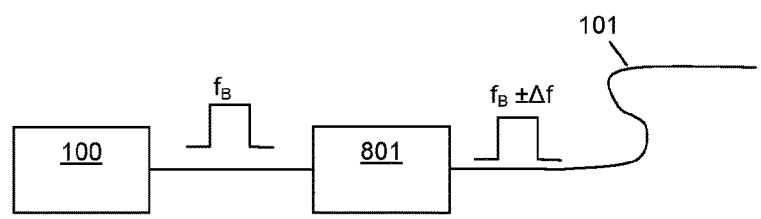
FIG. 8 illustrates a further embodiment of the present invention.

FIG. 8 shows one such embodiment. FIG. 8 shows an interrogator unit 100, which may be the same as the described above in relation to FIG. 1, which outputs an interrogating pulse for sensing fibre 101 as described previously. However in this embodiment, between the interrogator unit 100 and sensing fibre 101 is a frequency modulator 801 which may for instance be a suitable acousto-optic modulator (AOM). The frequency modulator acts to vary the frequency of the interrogating pulses input to sensing fibre 101 between interrogations so as to vary the operating point of the channels of the sensor for different interrogating pulses.

Thus the interrogator unit 100 may output pulses having a base frequency, $f_B$. The frequency modulator 801 applies a time varying frequency modulation to the pulses so that the output pulse which is transmitted into the sensing fibre 101 has a frequency $f_B \pm \Delta f$ where $\Delta f$ varies between at least some interrogating pulses, i.e. pulses of different interrogations.

In one embodiment a continual frequency variation is applied, i.e. the frequency is varied between each successive pulse.

As described above changing the frequency of the interrogating radiation between each interrogation will have the effect of changing the operating point of the various channels of the sensor between each interrogation. Changing the frequency of the interrogating radiation has a similar effect to applying a path length variation. In this embodiment however in addition to any unwanted frequency drift there is a deliberately introduced frequency variation.

The detected intensity from any given channel will thus have a response that (between interrogations) exhibits a variation due to the applied frequency modulation. Referring back to FIG. 4 in this instance the input could be seen as the applied frequency modulation of the interrogating pulses. The resultant output will therefore be a corresponding intensity variation in the detected backscatter signal which varies at the same rate as the frequency modulation is applied.

If the laser 102 and/or modulator 103 did exhibit some frequency drift over time this would result in an unknown modulation of the base frequency $f_B$. In a conventional DAS sensor any such variation in frequency would thus alter the response of the various channels as discussed above. As the frequency drift of the laser occurs over a relatively long timescales this results in a low frequency noise signal (of the order of a few tenths of Hz or lower).

By applying a deliberate known frequency modulation to the interrogating pulses, with a cycle frequency much higher than that of the laser noise, then any laser noise will manifest as a detectable amplitude modulation of the signal at this cycle frequency.

The laser noise affects all channels but, as previously discussed, the phase and amplitude of it will vary according to the location of the point on the operating curve. As a channel drifts to a different point on the operating curves the amplitude and phase of the laser noise signal will vary in the same way as the signal induced by the frequency modulation. The detected response of the various channels to the frequency modulation can then be used to correct for the laser noise. In essence the data could be divided into time bins shorter than the typical period of a fading cycle. For each time step channels exhibiting the largest amplitudes at the applied modulation cycle frequency could be selected (to avoid using channels which are faded at that time bin). The channels selected could be limited to those in a region near to the start of the fibre, e.g. a relatively long length, e.g. 1 km, near the start of the fibre. As the laser noise will be the same throughout the fibre it is not necessary to process every channel—although a suitable number are chosen to provide a good measure of the laser noise. Typically channels near the start of the fibre are used where optical losses will be relatively low.

In a similar manner as described previously the low frequency signal from each channel could then be scaled according to the amplitude and phase of the applied frequency modulation. The mean of all the scaled channels could then be taken to provide the laser noise template for the low frequency signal. The low frequency noise for each channel could then be obtained from the template by scaling it according to the amplitude and phase of the applied modulation on that channel at the particular time. In this embodiment however the gain and/or polarity of the relevant sensing portion can be determined from the response to the deliberately applied frequency variation.

This technique allows for the low frequency noise affecting all of the fibre simultaneously to be identified and compensated for including those from further down the fibre that were not used to calculate the template.

It should be noted again that low frequency effects such as a temperature changes can be discriminated from laser noise by looking at whether all channels are affected in substantially the same way. Temperature effects, especially from leaks in a pipeline setting, are likely to be relatively local and affect only a few contiguous sensing portions. Laser noise however would affect all channels simultaneously so by forming the template from channels over a large length of fibre avoids it being corrupted by events such as a localised disturbance.

It should be noted that frequency variation could be a regular repeating variation or could just be an occasional predefined variation. The technique of applying a cyclic frequency variation may also be used to help identify other low frequency effects on the fibre and thus identify environmental low frequency stimuli such as caused by temperature or strain changes.

The extent of the frequency modulation excursion and the cycle rate of the frequency modulation may be chosen for a particular application. For detecting temperature variations which occur over the order of tens of seconds a frequency modulation of the order of a few hundred Hertz may be sufficient. The extent of the frequency modulation applied should be sufficient to result in a detectable change in operating point of the channels but is generally chosen so as to not produce too large a shift in operating point or the induced signal will become distorted. In some embodiments, especially for continual monitoring of low frequency strains or temperature variations, the extent of the frequency modulation may be chosen to be such that the operating curve can be approximated by a linear fit over the region covered by the modulation. Thus in some embodiments the extent of the frequency modulation applied may chosen so as to produce a phase modulation of no greater than $\pi/4$ radians, although smaller phase modulations may be acceptable, e.g. a phase modulation of $\pi/8$ or even a phase modulation of about $\frac{1}{8}$ radians may be acceptable. A frequency modulation of $\Delta f$ over a double pass through a fibre length of r meters would result in a phase modulation $\Phi = \Delta f \cdot 2r \cdot n \cdot 2\pi/c$. If r is 10 m say then allowing a phase modulation of say $\frac{1}{8}$ radians would allow a frequency modulation of $\pm 200$ kHz.

For example consider an interrogator unit arranged to launch pulses at the base frequency, $f_B$, with a ping rate of 2 kHz say. The frequency modulator 801 may be arranged to vary the frequency between say $\pm 200$ kHz with a cycle rate, $f_C$, of say 400 Hz. This means that over the course of five interrogating pulses the frequency of each interrogating pulse will vary somewhere between $f_B + 200$ kHz and $f_B - 200$ kHz. In some applications however it may be preferred to use a lower cycle rate of the frequency modulation as, in some instances, it may be easier to track. The period of the frequency modulation cycle may be chosen according to the application, although the period of the frequency modulation cycle should be much shorter than the period of the low frequency signal of interest. For example a cycle rate, $f_C$, of the order of 20 Hz may be appropriate for some applications.

In other embodiments the extent of the frequency modulation may be greater to allow more of the operating curve to be mapped. This could be of use for example in interpreting measurement signals in response to a high strain stimulus, e.g. allowing unwrapping of the measuring signal.

The modulator(s) used to generate the frequency modulation should be appropriate for the desired frequency modulation. Acousto-optic modulators typically have a working frequency modulation range over which the output is approximately constant and beyond the working frequency range the amplitude of light may start to decrease. Thus the type of frequency modulator used may partly limit the extent of frequency modulation applied.

The frequency modulator may apply a single frequency modulation to the entire interrogating pulse. Thus the frequency between successive pulses varies in a step-change manner. If the ping rate is an integer multiple of the frequency modulator cycle rate, say n times the cycle rate, then there will be a repeating cycle of n pulses of different frequency. Thus the frequency modulator may be arranged to cycle through the n various frequency modulations within one cycle. For a step-wise change in frequency between each pulse using a ping-rate which is an integer multiple of the frequency modulator cycle rate limits the number of different frequencies that need to be generated. However it would be entirely possible to have a non-integer ratio between the ping-rate and frequency modulator cycle rate.

In other embodiments the frequency modulator may be driven so that the frequency variation applied varies continuously. Clearly the modulation will only be applied when a pulse is passing through the frequency modulator. Driving a frequency modulator in a continuous manner may, in some applications, be easier to implement than a step-wise change in frequency. This does mean however that the frequency modulation applied may vary throughout the pulse duration. The pulse duration is typically quite short however, for example the pulse duration in some applications may be of the order of 100 ns or so. With a frequency modulation cycle rate of 400 Hz or lower, and a frequency excursion of $\pm 200$ kHz the variation in the frequency modulation applied over the duration of the pulse is very low.

The amplitude of this variation in detected intensity will, in the same way as described previously depend on the operating point of the relevant channel at the base frequency $f_B$. In the absence of any strain or temperature induced changes on the optical fibre the amplitude of this 400 Hz signal in the detected intensity will thus be constant. In other words the detected intensity from each channel will exhibit a response at 400 Hz and, in the absence of any environmental changes affecting the fibre, the amplitude of the variation will be constant.

However if there is a temperature or low frequency strain change affecting the fibre the operating point of the affected channels will also move because of these changes. The amplitude of the 400 Hz signal will also thus change. Therefore, by monitoring the envelope or amplitude of the 400 Hz signal in the detected backscatter from a given sensing channel, any variations in operating point due to environmental changes can be detected. Likewise if the base frequency $f_B$ exhibits frequency drift due to the optical source not being entirely stable this will be seen as an additional modulation in amplitude of the detected backscatter signal.

Figure 9:
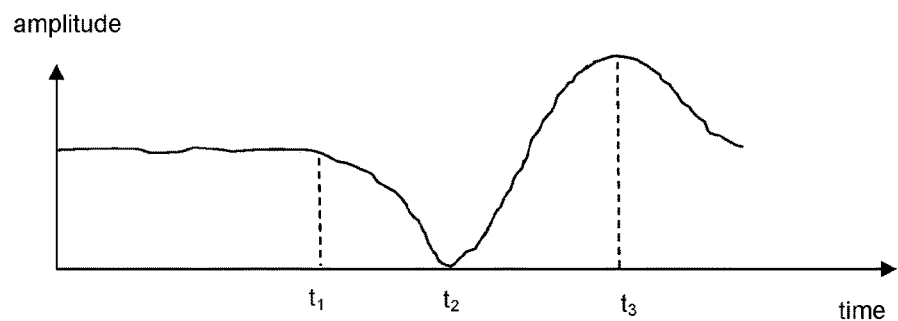
FIG. 9 illustrates how amplitude variations in the detected measurement signal can be used to track operating point variations.

FIG. 9 illustrates this principle and shows how the amplitude of a 400 Hz signal in the detected intensity for a given channel could vary over time. The detected intensity for a given channel would be filtered to identify a signal at the cycle frequency of the frequency modulator, e.g. corresponding to the 400 Hz modulation in the example discussed above. The amplitude or envelope of this 400 Hz measurement signal would then be tracked over time, for example over a few minutes. In this example the detected amplitude is relatively constant for a first period, up to $t_1$, indicating that the steady-state operating point of the channel is relatively constant and thus the relevant section of fibre is at a constant temperature. At $t_1$ however the amplitude of the 400 Hz signal starts to change, indicating a temperature induced change in the steady state operating point of the channel. The amplitude progressively drops to near zero at $t_2$ indicating that the operating point is crossing a maximum or a minimum in the operating curve. The amplitude then continues to progress to a maximum at time $t_3$, which indicates that the operating point is near the maximum gradient part of the operating curve (e.g. operating curve 2 as illustrated in FIG. 5 would apply in steady state). It can be seen that monitoring the amplitude of the 400 Hz signal can be used to track any variation in the operating point. Further the rate of change of amplitude can be used as an indication of the rate of temperature change. If the temperature variation were to continue the amplitude plot illustrated in FIG. 9 would reach another minimum as the next maximum or minimum in the operating curve is crossed. The rate of crossing maxima/minima in the operating curve provides a good indication of the rate of temperature change.

Operating point changes can additionally or alternatively be detected by monitoring a change of polarity of the 400 Hz signal in a given channel's output compared to the frequency modulation. Thus if the output intensity for a channel increases and decreases respectively when the frequency of the interrogating pulse increases and decreases respectively the channel could be said to have the same polarity as the applied frequency modulation, or alternatively be in phase with the applied modulation. If however the reverse is true the output channel may be said to be of the opposite polarity to, or in anti-phase with, the applied modulation (although it will be appreciated that the designations of what output response is of the same polarity as, or in phase with, the applied modulation is arbitrary).

Whether a given channel is in-phase or in anti-phase will depend on which side of a maximum in the intensity/bias curve the operating point is located on, or put another way the local gradient of the operating curve at the steady-state operating point. If the operating point changes so that the operating point crosses a maximum or a minimum the output response will relatively abruptly change polarity, i.e. change from in-phase to anti-phase or vice versa. Thus detecting a change in phase or polarity of the output variation compared to the frequency modulation applied may be used to detect a shift of operating point of a channel due to temperature variation or a low frequency strain. It will of course be appreciated that if the operating point in the absence of any frequency modulation is near a maximum or minimum in the operating curve the applied frequency modulation may cause the operating point to move across the maximum or minimum at the 400 Hz cycle rate. In such conditions the exact phase or polarity of the output may be difficult to determine. However over a time scale of several minutes a progression from one polarity to the opposite polarity, i.e. a relatively sudden change in phase will be apparent and can be used as an indication of a temperature induced change in operating point of the relevant channel.

Such a distributed acoustic sensor may therefore be used to provide monitoring for temperature changes in addition to detecting any laser phase noise. Monitoring for temperature changes may be useful in lots of different applications. One particular application for instance may be for leak detection in pipelines, especially oil or gas pipelines. Detecting a leak in an oil or gas pipeline is important for both safety and environmental concerns as well as avoiding loss of product.

Gas is typically highly pressurised in pipeline and thus if gas escapes via a leak rapid expansion with a consequent cooling effect is experienced. Oil is typically transported at an elevated temperature to improve flow and escape of oil from a pipeline via a leak may cause heating of the local environment. In both cases therefore a relatively sudden onset of a leak may lead to a relatively quick temperature change in the local environment, i.e. of the order of a few minutes. It has been proposed to detect such leaks using conventional DTS sensors based on Brillouin or Raman scattering. As mentioned however such sensors require a relatively long time average to provide accuracy and such sensors may not be suited to rapidly identify small temperature changes. The methods of the present invention provide a gain in signal-to-noise ratio for the thermal noise signal of interest, which is a particular advantage. This allows the methods to usefully be employed even where very little light is being returned from the sensing fibre, for instance for sensing channels at the end of a long fibre and/or where there are various losses between the sensing channel and the detector for instance due to fibre attenuation, connectors, splices or the like. In such low light situations it may not be possible to determine any low frequency temperature effects in the absence of the applied frequency modulation.

In some embodiments the temperature sensing could be a secondary detection effect. For instance the optical fibre could be at least partly deployed within or coupled to a material that exhibits temperature changes in response to certain stimuli or in the presence of certain analytes. For instance sections of the fibre could be coated with a material that exhibits an exothermic or endothermic reaction in the presence of an analyte. Any significant temperature changes in the coated sections could indicate the presence of the analyte. Sections of the fibre could also be uncoated to provide a control indication of environmental temperature changes.

In some embodiments the sensor may be operated to detect acoustic stimuli acting on the sensing fibre in addition to providing sensing for temperature or low frequency strain variations.

Referring to the example discussed above where the sensor varies the frequency between each successive pulse it will be clear that the frequency modulation will result in inherent intensity variations between successive pulses. As mentioned previously for performing DAS it may be preferred to compare the intensity backscattered from interrogating pulses of the same frequency to avoid any artefacts introduced by the frequency modulation.

If the frequency modulator 801 applies a repeating series of frequency modulations to interrogating pulses and the ping rate is an integer multiple of the cycle rate, $f_C$, of the modulator 801, then a pulse with a given frequency will repeat once each cycle. It may therefore be possible to compare the response to pulses of the same frequency at a pulse rate equal to that of the frequency modulation.

In other words if the ping rate is n times the cycle frequency of the frequency modulator, where n is an integer, then every nth pulse will be a given frequency $f_1$. Thus the intensity response for a channel for every nth pulse could be compared in the same manner as for a conventional DAS intensity based sensor as described above to effectively provide a DAS sensor operating at a ping rate equal to the cycle rate of the frequency modulator. Thus in the example discussed above with a ping rate of 2 kHz and a frequency modulation cycle rate of 400 Hz, every fifth interrogating pulse will have the same frequency. Thus the response from every fifth pulse could be analysed as discussed above to detect any acoustic stimuli acting on the fibre with a frequency below 200 Hz. In this arrangement it would be possible to analyse multiple series of fifth pulses, i.e. the detected response to pulses 1, 6, 11 etc all at frequency $f_1$ could be compared as one sensor series with the response to pulses 2, 7, 12 etc all at frequency $f_2$ being compared as separate sensor series and so on.

It will be noted that depending on the frequency modulation applied and the ratio of the ping rate to the frequency modulation cycle, the same frequency could be repeated within a frequency modulation. For example if the ping rate was an even integer multiple of a sinusoidal type frequency cycle modulation and the first pulse in each frequency cycle was synchronised to no applied frequency modulation then the pulse half way through the cycle would also be at the base frequency. These pulses could be used for DAS at an updated rate of twice the frequency cycle modulation rate. In some applications it may be possible to have a cycle of just four pulses, the first and third pulses of each cycle being at a base frequency and the second and fourth pulses having equal and opposite frequency modulations. This would provide a series of pulses at the base frequency at half the ping rate that can be used for DAS as well as the complete series of pulses exhibiting the frequency modulation cycle that could be used to monitor low frequency temperature/strain effects. The repeating series of the second pulses in each cycle could also provide another series at a frequency $f_B+\Delta f$ say at a rate equal to a quarter of the ping-rate and likewise the repeating series of the fourth pulses in each cycle would provide a series at a frequency $f_B-\Delta f$ say. Alternatively a repeating cycle of four pulses could comprise two pulses of frequency $f_B+\Delta f$ followed by two pulses of frequency $f_B-\Delta f$. This corresponds to a frequency modulation of $\pm\sqrt{2}\cdot\Delta f$ at a cycle rate of a quarter of the ping rate.

If a larger frequency excursion was chosen so that a full cycle of frequency modulation would lead to a variation in operating points over a full cycle of the operating curve, then the slope of the operating curve would be significantly different for each frequency. In such a case at least one frequency should (for a given channel) lead to an operating point relatively near the maximum slope of the operating curve (especially if the value of n is relatively high) and so would produce the largest possible output signal for that channel for a given disturbance to the fibre. If the sensor series outputs from all frequencies were initially analysed then the one with the largest output signal could be selected for further processing. In other words the sensor series derived from the pulses at frequency $f_1$ could be compared with the sensor series derived from the pulses at frequency $f_2$ and so on to determine which sensor series was exhibiting the greatest variation in intensity, i.e. the greatest gain, for a given channel. The relevant frequency series could then be used as the acoustic measurement signal for that channel—possibly with a periodic recalibration.

Such a large frequency excursion would lead to a relatively distorted signal at the cycle rate of the frequency modulation, which may reduce the usefulness for continual monitoring of low frequency temperature and strain effects. However such a large frequency excursion does ensure that for each channel of an acoustic sensor there is a series of interrogating pulses that should lead to a near maximum gain—albeit at an update rate equal to the frequency cycle rate.

For disturbances that are continuous or repetitive the same approach could be used but instead of cycling through the frequencies on a pulse by pulse basis, one frequency could be repeated for an fixed length of time, say 1 second, before doing the same with the next frequency in the cycle. This would mean data would be available at the full ping rate for each frequency.

Additionally or alternatively interrogating pulses with a frequency modulation may be interleaved with one or more pulses at a defined constant frequency. Thus for example every second pulse may have a defined constant frequency and thus can be used for DAS at one half of the ping rate whereas the other pulses exhibit a frequency variation and are used for monitoring any variations in operating point as described above. In effect a series of pulses at a constant frequency and a first ping rate may be interleaved with a series of pulses of varying frequency at the same ping rate. For instance a series of pulses of a fixed frequency $f_B$ may be interleaved with a series of pulses having a repeating frequency sequence $f_1, f_2, f_3, f_4, f_5$. Preferably the frequency sequence $f_1$-$f_5$ modulates the frequency about $f_B$ as described above. If the overall ping rate was 2.5 kHz this would lead to a ping rate of the pulses $f_B$ for DAS of 1.25 kHz and a frequency modulation cycle rate of 250 Hz. This approach would be useful if the frequency modulation rate was desired to be within the acoustic band of interest, as the measurements at $f_B$ could be used to get the acoustic information without being corrupted by the frequency modulation signal which itself could be measured using frequencies $f_1$-$f_5$ provided its amplitude was significantly larger than the acoustic signal at that frequency.

Additionally or alternatively wavelength division multiplexing techniques could be applied so that a first series of pulses at a first wavelength is transmitted with each pulse having the same frequency for distributed acoustic sensing. A second series of pulses, at a second wavelength, could be transmitted with a frequency variation between the pulses as discussed above to provide independent monitoring for temperature induced changes.

In some embodiments however the intensity variation detected in response to the frequency modulation around a base frequency, $f_B$, may be used to infer information about the steady state operating point when interrogating with pulse of frequency $f_B$. In other words in addition to, or instead of, detecting any variations in operating point arising from temperature variations and the like, a frequency modulation may be applied to at least some interrogating pulses so as to determine the current operating point of the sensor channel when no frequency modulation is applied. This information about the operating point may then be used in processing the data from the channel(s) acquired with no frequency modulation applied and/or in determining the laser phase noise template.

For instance, the polarity or phase of the channel could be determined, i.e. the sign of the local gradient of the operating curve about the steady-state operating point. This can be determined by looking for whether the variation in detected intensity increases or decreases with an increase in frequency. Alternatively the response from various channels could simply be compared to one another to determine whether any two channels are in phase or in anti-phase. For any channels which are in anti-phase it will therefore be appreciated that if the same acoustic stimulus is received at both channels the output intensity variation resulting from that stimulus would also be in anti-phase. For a group of channels it would therefore be possible to determine, from looking at the response to the applied frequency modulation, a first set of channels in phase with one another and a second set of channels also in phase with one another but in anti-phase with the first set. The actual detected intensity signals from the second set of channels may therefore be inverted so as to bring the second set of channels into phase with the first set. This may then allow array processing techniques to be applied to the returns from all channels.

Note there may of course also be a third set of channels where the phase is difficult to determine. Typically however this will occur where the operating point is near a maximum or a minimum. At a minimum in the operating curve the backscatter signal may be nearly completely faded anyway and thus it may be no detectable signal is present anyway. Even if a detectable signal is present at a minimum in the operating curve the gain of the relevant channel will be low. At a maximum in the operating curve there will be a backscatter intensity but the gain of the channel will be low and thus the signal to noise ratio for that channel may be low anyway.

The method may also be used to detect which channels are at or near a maximum of minimum in their operating curve. As mentioned these channels may exhibit a low SNR. Knowing that a particular channel exhibits a low SNR may be of use in processing looking for a similar signal affecting several channels. Channels with low expected SNR or a low gain may be omitted from processing or flagged with a high probability of error in any kind of confidence based processing. For instance channels with a low SNR may be omitted from the first set used to form the laser noise profile.

In some embodiments the response to the applied frequency modulation may be used to determine an estimate of gain of a channel or track a change in gain over time. In some embodiments a gain correction factor could then be applied to the measurements detected from one or more channels. In channels where the gain is extremely low, applying a correction factor would likely only result in the amplification of noise; in this instance, that channel could be labelled as 'faded' and discarded.

For instance the amplitude of the intensity variation in response to the frequency modulation could be determined and monitored over time. If the amplitude variation increases or decreases as a result of wander of the steady-state operating point (for instance due to temperature changes) this will indicate that the gain of the relevant channel is changing. A gain correction factor could be applied to compensate for any such gain wander. Additionally or alternatively the intensity variation from various channels to the applied frequency modulation could be detected and used to derive a normalisation factor across different channels.

In some embodiments non-linearity in the output intensity variation compared with the applied frequency modulation may be determined and/or corrected for. As described above the shape of the operating curve for a given channel will determine the output intensity variation in response to the applied frequency modulation. The shape of the applied frequency modulation is known which allows the detected frequency variation to be used to determine information about the shape of the operating curve for that channel and/or correct for any non-linearity. In effect the detected response may be compared to an ideal linear response to identify the extent of the non-linearity. In this instance it may be beneficial to use a frequency excursion for the frequency modulation which is sufficiently large to determine the shape of the operating curve. Information regarding the shape of the operating curve may then be applied to any acoustic signals detected from a given channel. A variety of non-linear distortion signal recovery techniques could be applied. For example a non-linear scaling factor could be applied based on the detected intensity variation. Adjusting a detected measurement signal to account for the shape of the local operating curve represents another aspect of the present invention.

All of these techniques would improve the consistency and reliability of the measurement signals detected for DAS sensing and may be used to allow coherent processing/array based processing techniques to be applied. The use of a frequency modulation of at least some interrogating pulses may therefore be of use for improving the operation of a DAS sensor, even if temperature change or low frequency strain sensing is not applied.

In such embodiments it will therefore clearly be necessary to transmit a regular series of pulses at a repeated frequency $f_1$ that can be used for DAS whilst also transmitting some pulses which are frequency modulated with respect to $f_1$ to allow the operating point characteristics of the channels to be determined.

The discussion above has generally focussed on a regularly varying sinusoidal type frequency modulation being applied. However other forms of frequency modulation may be applied as required. For example there could be a repeating frequency ramp, e.g. the frequency modulator could be driven by a sawtooth type waveform. There may in some application be advantages in applying a random or pseudo-random frequency modulation. Some compressive sensing techniques take advantage of random sampling. Thus a step-wise type frequency modulator may be driven to apply a random frequency modulation, possible from a selected set of possible frequencies, to interrogating pulses. The series of randomly frequency modulated pulses could be interleaved with interrogating pulses of a known constant frequency to allow for DAS sensing.

Referring back to FIG. 8 the frequency modulator 801 could readily be arranged to apply a frequency modulation to some pulses and not to others and/or apply any pattern of frequency modulation required in response to a suitable control signal.

Note in FIG. 8 the frequency modulator is illustrated as being external to the interrogator unit. This is one possible implementation and embodiments of the present invention may be implemented by retrofitting to existing DAS interrogator units. However in other embodiments the frequency modulator 801 may form part of the interrogator unit and may be located in the transmit path only. In some instances frequency modulator 801 could be provided instead of modulator 103 illustrated in FIG. 1—or modulator 103 could be configured to act as the frequency modulator and pulse generator. In some applications frequency modulation may be applied by modulating the operating conditions of the laser 102.

Embodiments of the invention may be arranged as part of an interrogator unit for a distributed fibre optic sensor or as an add-on or retrofit to such an interrogator unit. Embodiments of the invention may be implemented as temperature change sensors or distributed acoustic sensor a sensor with combined DAS/temperature variation capability. The methods of data analysis may be applied to data acquired from a suitable sensor to which a suitable modulation was applied. The method may be implemented by software.

The invention has been described with respect to various embodiments. Unless expressly stated otherwise the various features described may be combined together and features from one embodiment may be employed in other embodiments.

It should be noted that the above-mentioned embodiments illustrate rather than limit the invention, and that those skilled in the art will be able to design many alternative

The invention claimed is:

1. A method of distributed fibre optic sensing comprising:
   repeatedly interrogating an optical fibre with at least one interrogating pulse of optical radiation and detecting optical radiation which is Rayleigh backscattered from within said fibre to form a measurement signal for each of a plurality of sensing portions of said sensing fibre;
   forming a laser noise template based on the measurement signals within a frequency band of interest from a first set of said sensing portions; and
   applying a correction to the measurement signals from said plurality of sensing portions based on said laser noise template.

2. A method as claimed in claim 1 wherein said first set of sensing portions comprises at least one sensing portion in a part of the optical fibre which is arranged to be substantially isolated from temperature and/or strain changes.

3. A method as claimed in claim 1 wherein said first set of sensing portions comprises substantially all of said plurality of sensing portions.

4. A method as claimed in claim 1 said first set of sensing portions is selected by analysing the measurement signals to identify measurement signals that exhibit the largest variation within said frequency band of interest.

5. A method as claimed in claim 1 wherein said first set of sensing portions comprises more than one sensing portion and wherein forming said laser noise template comprises averaging the measurement signals within said frequency band of interest from said first set.

6. A method as claimed in claim 1 wherein interrogating the fibre comprises launching two spatially separated pulses at different frequencies and wherein said measurement signal represents a determined change in phase.

7. Method as claimed in claim 6 wherein applying the correction to the measurement signals comprises subtracting the laser noise template from said measurement signals.

8. A method as claimed in claim 1 wherein interrogating the fibre comprises launching one pulse and wherein said measurement signal represents a determined change in intensity in backscatter.

9. A method as claimed in claim 8 wherein said first set of sensing portions comprises more than one sensing portion and wherein forming the laser noise template comprises normalising a measure of the amplitude of the measurement signals for each of the sensing portions of the first set within said frequency band of interest prior to averaging said measurement signals.

10. A method as claimed in claim 8 wherein said first set of sensing portions comprises more than one sensing portion and wherein forming the laser noise template comprises aligning the polarity of the change in intensity for the measurement signals for each of the sensing portions of the first set within said frequency band of interest prior to averaging said measurement signals.

11. A method as claimed in claim 8 wherein applying a correction to said measurement signals from the plurality of sensing portions comprises, for each sensing portion, determining a gain-time profile for that sensing portion, scaling the laser noise template by the gain-time profile, and subtracting the scaled laser noise template from the measurement signal for that sensing portion.

12. A method as claimed in claim 11 wherein determining said gain-time profile for a sensing portion comprises scaling the laser noise template to match the peak-to-peak intensity variation in the measurement signal within the frequency band of interest within a first time window and, within a plurality of time sub-windows within the first time window identify a gain value that minimises the error between the measurement signal and the laser noise profile in that time sub-window.

13. A method as claimed in claim 1 wherein the method comprises applying a frequency variation to the optical radiation of at least one interrogation compared to another interrogation.

14. A method as claimed in claim 13 comprising identifying a change in the measurement signals from said sensing portions resulting from said frequency variation and using said identified change to determine at least one characteristic of an operating point of the sensor portion.

15. A method as claimed in claim 14 wherein said characteristic of an operating point comprises at least one of a gain value and a polarity of intensity change for said sensing portion.

16. A method as claimed in claim 14 wherein said laser noise template is based on the measurement signals for said first set of sensing portion adjusted by said determined characteristic of an operating point.

17. A method as claimed in claim 13 wherein said frequency variation comprises a cycle of frequency modulation which repeats at a modulation cycle rate.

18. A method of processing data from a distributed fibre optic sensor, the method comprising:
   taking data corresponding to a measurement signal for each of a plurality of sensing portions of said distributed fibre optic sensor, the measurement signal being indicative of changes in detected optical radiation which is Rayleigh backscattered from within an optical fibre in response to repeated interrogations of said optical fibre with at least one interrogating pulse of optical radiation;
   forming a laser noise template based on the measurement signals within a frequency band of interest from a first set of said sensing portions; and
   applying a correction to the measurement signals from said plurality of sensing portions based on said laser noise template.

19. Computer software on a non-transitory storage medium which, when run on a suitable computing device, performs the method of claim 18.

20. A distributed fibre optic sensor apparatus comprising:
   an optical source configured to repeatedly interrogating an optical fibre with at least one interrogating pulse of optical radiation;
   a detector for detecting optical radiation Rayleigh backscattered from within said optical fibre;
   a processor configured to:
      form a measurement signal for each of a plurality of sensing portions of said sensing fibre;
      form a laser noise template based on the measurement signals within a frequency band of interest from a first set of said sensing portions; and
      applying a correction to the measurement signals from said plurality of sensing portions based on said laser noise template.

* * * * *